United States Patent [19]
Laribe

[11] 3,914,593
[45] Oct. 21, 1975

[54] MOTOR VEHICLE HEADLIGHTS

[75] Inventor: Armand Laribe, Saint-Cere, France

[73] Assignee: Jean Freitag, Dijon, France; a part interest

[22] Filed: June 8, 1973

[21] Appl. No.: 368,130

Related U.S. Application Data

[63] Continuation of Ser. No. 174,083, Aug. 23, 1971, abandoned.

[52] U.S. Cl................... 240/41.35 R; 240/7.1 R
[51] Int. Cl.............................................. F21v 7/00
[58] Field of Search.......... 240/7.1, 41.35, 41.35 C, 240/41.35 F, 41.37, 46.69

[56] References Cited
UNITED STATES PATENTS

| | | | |
|---|---|---|---|
| 1,306,511 | 6/1919 | Ames | 240/41.35 R |
| 1,554,427 | 9/1925 | Englen | 240/41.35 F |
| 1,815,751 | 7/1931 | Whalen | 240/41.35 C |
| 3,176,124 | 3/1965 | Cibie | 240/41.35 R |

FOREIGN PATENTS OR APPLICATIONS

| | | | |
|---|---|---|---|
| 514,201 | 11/1939 | United Kingdom | 240/41.35 C |
| 178,388 | 4/1922 | United Kingdom | 240/41.35 |

*Primary Examiner*—Samuel S. Matthews
*Assistant Examiner*—Alan Mathews
*Attorney, Agent, or Firm*—Larson, Taylor and Hinds

[57] ABSTRACT

A reflector for a motor vehicle headlight whereby an intense and narrow central beam of light can be obtained at least in a horizontal zone and wider but less intense side beams than the central beam, the said central and side beams merging without any abrupt variation in intensity. A reflector of this type may be used for all kinds of headlights, for example, undipped-beam, dipped-beam, fog and other lights. Particularly, they are used in "dipped-beam" headlights for motor vehicles, such as a headlight having a reflector and a light source with a screen or cup adapted to intercept the part of the beam of light emitted by the source which would otherwise be directed upwardly, so that the driver of an on-coming motor vehicle is not dazzled thereby.

8 Claims, 6 Drawing Figures

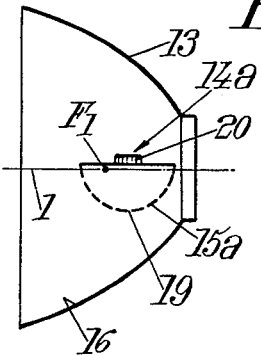
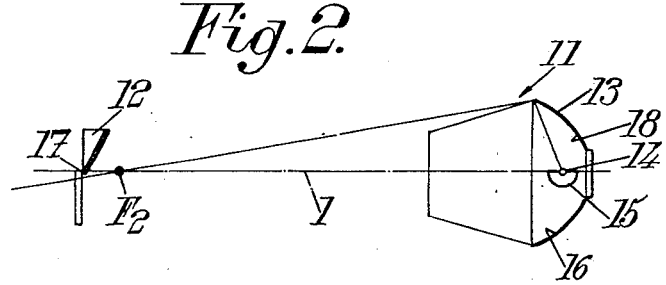
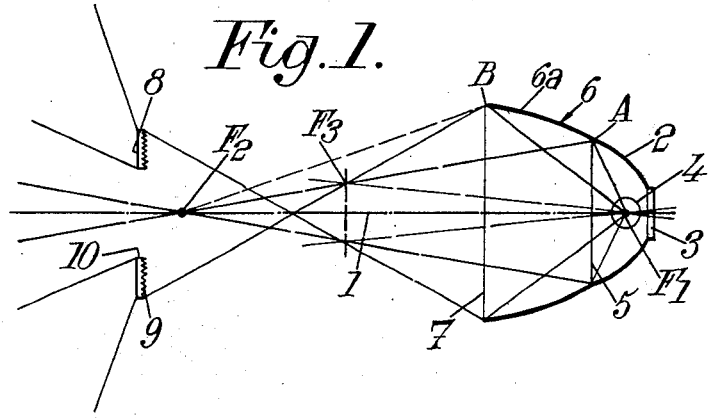

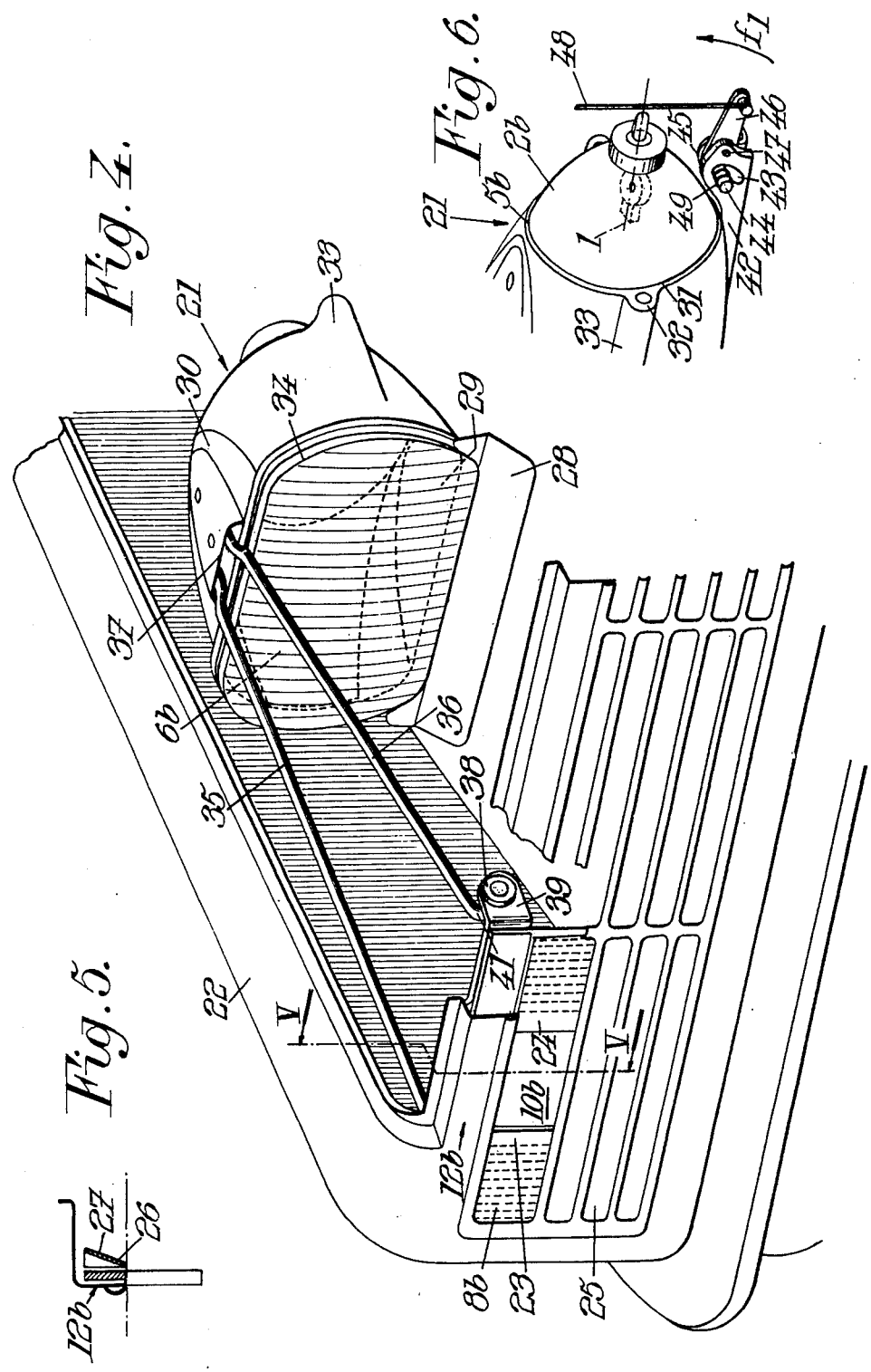

MOTOR VEHICLE HEADLIGHTS

This is a continuation of application Ser. No. 174,083 filed Aug. 23, 1971.

FIELD OF THE INVENTION

This invention relates to reflectors for a motor vehicle headlight whereby an intense and narrow central beam of light can be obtained at least in a horizontal zone and wider but less intense side beams than the central beam, said central and side beams merging without any abrupt variation in intensity. The invention also relates to motor vehicle headlights, particularly headlights used against on-coming traffic, which will hereinafter be referred to as "dipped-beam headlights," said headlights comprising a reflector and a light source and, in the case of dipped-beam headlights, a screen or cup adapted at least largely to intercept the part of the beam of light emitted by the source which would be directed upwardly in the absence of said screen. It will be appreciated that the dipped-beam headlights are not physically dipped but are optically dipped.

SUMMARY OF THE INVENTION

The main object of the invention is to provide a reflector for headlights of the above type so portions to give a beam of light the side pportions of which are of less light intensity than the central portion, the central and side portions of the beam merging continuously without any abrupt intensity variation.

Another object of the invention is to provide dipped-beam headlights so that their brightness to a driver of an on-coming vehicle is low, the brightness (or luminance) of the light source of course being the light intensity emitted per unit of visible surface of the said source in a given direction.

Another object of the invention is to provide dipped-beam headlights of such construction that their performance is substantially unaffected by bad weather.

A headlight reflector according to the invention is characterised in that it comprises at least one dome-shaped segment of an elongate ellipsoid of revolution, inside which the first focus of the said ellipsoid is situate and connected to said dome-shaped segment, ellipsoidal surfaces which form at least the side parts of the reflector the whole arrangement being such that the section of the said ellipsoidal surfaces through a plane passing through the major axis of the said ellipsoid contains two elliptical arcs, each of which has a first focus coinciding with the first focus of the said ellipsoid and a second focus situated on the straight-line segment joining the second focus of the said ellipsoid to the junction point of the corresponding elliptical arc and the elliptical arc constituting the section of the said dome-shaped part through the plane passing through the major axis of the ellipsoid.

A dipped-beam headlight according to the invention is characterised in that it comprises in combination with the above reflector, a mask disposed forwardly of said reflector so that it at least partially masks from the driver of an on-coming vehicle that part of the reflector which reflects the rays not intercepted by the cup, without said mask cutting the beam of light reflected by the reflector.

Other objects, features and characteristics of the invention will be apparent from the following more detailed description of preferred embodiments of the invention, with reference to the accompanying drawings.

BRIEF DESCRIPTION OF DRAWINGS

FIG. 1 is a diagrammatic horizontal section of a headlight according to the invention and shows the path of some of the rays of light from the source.

FIG. 2 is a diagrammatic vertical section of a dipped-beam headlight according to the invention.

FIG. 3 is a vertical section of details of the reflector of the headlight shown in FIG. 2.

FIG. 4 is a perspective view of a dipped-beam headlight fitted into a motor vehicle body and provided with a number of the improvements according to the invention.

FIG. 5 is a diagrammatic partial vertical section on the line V — V in FIG. 4.

FIG. 6 shows a part of the fixing and adjusting means according to the invention for the body of the reflector in the motor vehicle body.

DETAILED DESCRIPTION OF THE INVENTION

FIG. 1 illustrates one embodiment of a reflector in section on a horizontal plane through the optical axis 1. The reflector comprises a segment 2 or dome-shaped part of an elongate ellipsoid of revolution, the major axis of which forms the optical axis 1 of the reflector, and an ellipsoidal surface 6.

The segment 2 contains the first focus F1 of the ellipsoid of revolution and, in the embodiment illustrated, has an opening 3 in the region of the apex corresponding to the focus F1, the object of the opening 3 being to allow the passage of the light source 4 and securing of fixing means (not shown) for the latter.

The light source 4 is disposed at or near the focus F1 and may have one or two filaments depending upon whether the headlight is to provide a single type of beam or is to be a compound headlight (providing dipped-beam and undipped-beam lighting). At the end remote from the opening 3, the segment 2 is bounded by a circumference 5 which forms the intersection of a plane perpendicular to the axis 1, and the height of the segment 2 considered along the axis 1 is preferably small in relation to the distance between the focus F1 and the second focus F2 of the ellipsoid.

The ellipsoidal surface 6 is connected to the segment 2 along the circumference 5. At the end remote from the circumference 5, the ellipsoidal surface 6 terminates in another circumference 7 which forms the front edge of the reflector and which, like the circumference 5, is situated in a plane perpendicular to the axis 1.

The characteristics of the elongate ellipsoid of revolution are so selected that the focus F2 is situated in front of the reflector, for example at a distance from the circumference 7 equal to approximately twice the distance between the circumference 7 and the opening 3. In the embodiment illustrated in FIG. 1, the ellipsoidal surface 6 is a surface of revolution about the axis 1 produced by an arc 6a of an ellipse situated in the sectional plane of FIG. 1. The ellipse arc 6a has a first focus which coincides with the focus F1 of the ellipsoid embodied by the segment 2 and a second focus F3 which is situated on the straight-line segment joining the second focus F2 of the ellipsoid embodied by the segment 2 to the point of intersection A of the circumference 5 and the plane of FIG. 1. The second focus F3 of the ellipse arc 6a is preferably situated outside the reflector.

The reflector described above satisfies the above objects because the source 4 is situated inside the segment 2 so that the latter is viewed from the source at a solid angle greater than that at which the ellipsoidal surface 6 is viewed from the same point, with the result that the light energy reflected by the segment 2 is greater than that reflected by the surface 6. Consequently, the intensity of the central beam reflected by the segment 2 is greater than the intensity of the side beam reflected by the surface 6. Also, since the central beam is the beam formed by the cone having the focus F2 as apex and the circumference 5 as base, said beam is relatively narrow because the circumference 5 has a relatively small diameter, the segment 2 being an elongate ellipsoidal dome-shaped part taken from the vicinity of an apex. Also, the side beam merges with the central beam without any abrupt variation in intensity because these two beams have a common radius (in the plane of FIG. 1) F2 − A and do not overlap. The beam reflected by the above-described reflector is wider than the beam which would be reflected by a reflector formed from a segment of one ellipsoid because if the surface 6 were to form part of the same ellipsoid of revolution as the segment 2, the beam reflected by the reflector would be laterally limited by the radius B − F2 (in the plane of FIG. 1), B being a point on the circumference 7, while in the reflector shown in FIG. 1 the beam is limited laterally by the radius B − F3 which is more inclined than the radius B − F2 in relation to the axis 1.

Depending upon the way in which the reflector is used it is possible to use the whole or else just parts of the ellipsoidal surface 6. For example, in the case of an undipped-beam headlight, it may be advantageous to use this surface 6 over its entire periphery while in the case of a dipped-beam headlight — as will be seen in greater detail hereinafter, more particularly in connection with FIG. 4 — it is possible to use just side parts of said surface 6.

The ellipsoidal surface 6 need not necessarily be a surface of revolution. A surface such that the focus F3 is in a different position on the segment A − F2 on the sectional plane passing through the axis 1 would also come within the scope of the invention; such an arrangement is advantageous when, for example, the beam is required to extend more on one side of the road than on the other.

According to a further feature of the invention, in order laterally to enlarge the beam emitted by the headlight, a plate 8 of transparent material is disposed in front of the reflector, preferably in front of the focus F2, the plate 8 having ribs 9 of prismatic section on one of its surfaces and near its edges, said plate being substantially perpendicular to the axis 1 and said ribs 9 being provided on the reflector side.

The central part of the plate 8 does not have any ribs and is advantageously formed with an aperture 10 of dimensions corresponding to those of the central beam; in this way, the central beam is not widened out whereas the prismatic-section ribs allow the side beam or at least one of the parts thereof to be widened.

The reflector provided with the above plate 8 having ribs 9 enables a large field of illumination to be obtained. The advantage of the aperture 10 is that if the plate 8 is disposed at a place exposed to bad weather, no dust or mud will accumulate at the level of the central beam. If the plate 8 were to have a transparent part at the level of the aperture 10, said part might become obscured by dust or mudsplashes, or covered with rainwater, thus diffusing the central beam.

In order to reduce the brilliance of the above dipped-beam headlight for the driver of an on-coming vehicle, the invention also provides a system comprising the said headlight together with a mask disposed in front of the reflector, said mask being such that its lower edge is situated substantially at the level of the optical axis of the reflector and that it masks the top half of the reflector from the driver of an on-coming vehicle.

A system of this kind is shown diagrammatically in FIG. 2, which is a vertical section through a plane passing through the axis 1 of a dipped-beam headlight 11 and a mask 12; the headlight 11 comprises a reflector 13 of the type shown in FIG. 1, a light source 14 and a hemispherical cup 15 adapted to prevent the rays of light emitted by the source 14 from reaching the bottom part 16 of the reflector 13, because the bottom part 16 would reflect the rays of light upwards, thus dazzling on-coming drivers.

The bottom edge 17 of the mask 12 is situated substantially at the level of the optical axis 1 of the reflector 13 and its dimensions are sufficient to mask the top part 18 of the reflector 13 from an on-coming driver. Preferably, the mask 12 is disposed in front of the focus F2 described in connection with FIG. 1.

The advantage of masking the top part 18 of the reflector 13 by means of the mask 12 is considerable, because a reflecting surface of this kind which reflects light downwardly is never free from faults and therefore diffuses part of the light that it receives, and this may result in dazzle. Of course, the mask 12 does not cut the dipped-beam emitted by the headlight.

The mask 12 need not necessarily completely mask the top part 18 of the reflector 13 and it may even be advantageous for an appreciable fraction of the part 18 to remain visible to give adequate identification of the vehicle, that is some of the light should reach the eyes of the drivers of on-coming vehicles so that the vehicle provided with the headlight constructed in this way is adequately visible. For this purpose, the bottom edge 17 of the mask 12 may be disposed slightly above the axis 1 and/or the mask 12 may be formed with apertures of any shape.

Another solution to the problem of identifying or marking the vehicle when a mask 12 is used is shown in FIG. 3 which diagrammatically illustrates a reflector 13, a light source 14a and a hemispherical cup 15a. As will be seen, the cup 15a is formed with small apertures 19 whereby a small fraction of the light emitted by the source 14a can meet the bottom part of the reflector and be reflected upwardly. Advantageously, the apertures 19 are disposed in positions on the cup 15a selected according to a given direction in which it is required to increase the headlight brightness. For example, if it is required to increase the brightness on the right-hand side of the road, apertures 19 will be formed only on the left-hand half of the cup 15a.

In order to dip and constrict the central part of the dipped-beam light emitted by the above headlight, according to the invention — as shown in FIG. 3 — the centre of the filament 20 of the source 14a (or the useful part of said source if the latter is not a filament-type lamp) is offset together with the associated cup 15a a small distance above the axis 1 and rearwardly of the focus F1 of the reflector 13.

When the filament 20 is disposed above the axis 1 on which the focus F1 is situated, the beam of light reflected by the top part of the reflector 13 is inclined downwardly; the slight rearward offset of the focus F of the said filament 20 enables the point of convergence of the beam to be brought near the aperture 10, thus reducing the angle at the apex of the cone formed by said beam.

According to another feature of the invention which is again intended to dip the central beam and constrict it in a horizontal zone, and which is of advantage particularly in the case of a dipped-beam headlight, the segment 2 of the reflector emitting the central beam is given a slight deformation which can be obtained by vertical stresses applied to the segment 2 preferably in the plane of the circumference 5 (FIG. 1) so as to render the latter oval, the major axis of the oval being horizontal. Experience has shown that the results are satisfactory when the major axis of the oval exceeds the diameter of the initial circumference by about 0.05 times the initial radius of said circumference.

Deformation of the segment 2 may either be permanent — and be produced by stresses before or during assembly — or temporarily produced by a frame surrounding the said segment.

FIGS. 4 and 5 illustrate a very advantageous embodiment which will be described hereinafter.

FIG. 4 is a perspective view of a dipped-beam headlight according to the invention wherein the reflector 21 is disposed beneath the front bonnet (not shown) of a vehicle, the mask 12b, which has the same function as the mask 12 and is adapted to mask the top part of the reflector 21, being a constituent part of the motor vehicle body 22, a transparent plate 8b similar to the plate 8 described in connection with FIG. 1 and having prismatic ribs and being disposed beneath the mask 12b and in extension thereof. In this embodiment, the plate 8b comprises two parts 23 and 24 having vertical prismatic ribs and separated by an aperture 10b, the function of which is identical to that indicated above in the case of the aperture 10 described in connection with FIG. 1. The parts 23 and 24 are advantageously incorporated into the vehicle radiator grid 25.

The dipped-beam headlight shown in FIG. 4 includes means according to the invention whereby any dazzle it might produce may also be reduced. These means allow the visible surface of the headlight to be increased without any appreciable increase in brightness and are shown in FIG. 5 which shows the mask 12b is connected to a mirror 26 disposed between the mask and the reflector, the reflecting surface 27 of the mirror 26 being situated on the reflector side and being substantially downwardly inclined to the vertical. The mirror 26 is so orientated that it reflects the rays of light originating from the reflector 21 (more particularly from diffusion from the reflecting surfaces of said reflector) to another reflecting surface 28 (FIG. 4) which is connected to the bottom front edge of the reflector 21. This reflecting surface 28 is so orientated that it reflects the rays it receives from the mirror 26 to the transparent plate 8b.

The surface 28 which forms an extension of the bottom edge of the reflector 21 thus clearly increases the visible surface of the latter while the increase in intensity is negligible, any rays that it receives originating from diffusion. The increase in the visible surface does not therefore result in any appreciable increase in dazzle.

One important advantage of the mask 12b is that given suitable orientation it can provide a dipped-beam lower on the left-hand side than on the right-hand side of the road (in the case of driving on the right) in order to avoid dazzling the on-coming driver while sufficiently illuminating the side of the road. This result is obtained by inclining the bottom edge of the mask or alternatively giving the bottom edge a suitable shape.

FIGS. 4 and 6 show the various parts of the reflector 21. The ellipsoidal surface 6 (FIG. 1) is provided only at 6b on the two side parts of the reflector, the bottom and top parts 29 and 30 respectively being substantially plane. On the other hand, referring to FIG. 6 (which is a perspective view of the rear of the reflector 21), the complete periphery 5b of the segment 2b corresponding to the segment 2 described in connection with FIG. 4 is utilised. FIG. 6 also shows the means used for mounting the reflector 21. The circumference 5b of the segment 2b is extended in the form of a collar 31 situated in a plane substantially perpendicular to the axis of the reflector, said collar 31 having lugs 32 fixed by screws (not shown) to the rear edge of projections 33 provided on the outer side portions of the reflector 21 at the level of the ellipsoidal surfaces.

The reflector is protected by means of a transparent plate 34.

In order both to fix the reflector 21 relatively to the vehicle body and adjust its position, that is in other words adjust the inclination of the beam it emits, the invention uses means whereby the reflector body 21 can be locked in a plurality of positions in a vertical plane about a horizontal axis situate forwardly of said reflector.

Said means preferably comprise, firstly, members which provide a pivotable connection of the reflector body about its axis and, secondly, support elements adapted to pivot the reflector body about said axis and lock it in a plurality of positions about said axis.

In the preferred embodiment illustrated in FIGS. 4 and 6, the said members consist of two rods 35 and 36 rigidly connected to one end to the reflector body 21, for example by means of a fixing plate 37, and rotatably supported at their other end, for example by means of a curved part 41 as shown in FIG. 4, by a bearing such as a horizontal-axis bush (FIG. 4 shows only the bush 38 corresponding to the rod 36), said two axes being situated in extension of one another and forming the said horizontal pivot axis. The bushes supporting the curved ends 41 of the rods 35 and 36 are supported by bodywork elements, for example bends 39 forming a continuation of the mask 12b to the rear of the vehicle.

The said support elements, which are adapted to modify the position of the reflector body in the vertical plane, comprise a vertical lug 42 connected to the reflector body and provided with an elongate slot 43 in the form of a circular arc, centred on the said horizontal pivot axis.

The lug 42 co-operates with a horizontal-axis rod 44 extending through the hole 43 and borne by a vertical lug 45 connected to the vehicle body. The maximum amplitude of the pivoting movement of the reflector 21 about the said horizontal axis is determined by the dimensions of the elongate hole 43, the end positions being reached when the rod 44 is in contact with either end of said hole.

To pivot the reflector body 21 about the said horizontal pivot axis, it is possible to use a lever 46 which is connected to, so as to rotate with, a horizontal pin 47 borne by the lug 42, one of the ends of said lever bearing on the rod 44 and the other being connected to a control member 48 which can be retained in any position by locking means (not shown) and connected, for example, to a control on the vehicle dashboard.

It is advantageous to provide resilient means which apply the lug 42 against the lug 45, said means possibly being a helical spring 49 borne by the rod 44.

In the embodiment illustrated in FIG. 6, the lever 46 is disposed between the lugs 42 and 45.

Operation of the above-described system will be apparent from FIG. 6, in which the reflector body 21 is illustrated in its lowermost position, rod 44 being in contact with the top end of the elongate hole 43.

To pivot the reflector body 21 upwardly, that is to dip the direction of the emitted beam, the lever 46 is simply pivoted about the pin 47 in the direction of the arrow F1 by means of the control member 48 so that the free end of the lever 46 bears on the rod 44 and the lug 42 is driven upwardly, the system being retained in the selected position by the locking means indicated above.

All of the above embodiments provide a headlight whose features and advantages are sufficiently clear from the foregoing so that no further description is necessary.

Of course, and as will be apparent from the foregoing, the invention is not limited solely to those of its applications nor to those of the embodiments of its various parts which have been more particularly indicated, but covers all variants thereof.

I claim:

1. A dipped-beam headlight for a motor vehicle, which headlight comprises a reflector, a light source disposed at or near the focus of the said reflector, and a device adapted to intercept at least a major portion of that part of the beam of light emitted by the said source which would be directed upwardly by the said reflector in the absence of said device, said reflector comprising, first and second parts, said first part comprising a dome-shaped segment whose surface is a surface of an elongate ellipsoid of revolution, this dome-shaped segment defining a rear part of the reflector, said second part comprising a forward part, connected to said rear part along the forward circumference of said segment, this forward part including ellipsoidal surfaces, distinct from the surface of said ellipsoid of revolution, which ellipsoidal surfaces define the forward portion of the reflector, the assembly being such that the section of the ellipsoidal surfaces through the plane containing the major axis of said ellipsoid of revolution contains two elliptical arcs, each of which has a first focus which coincides with the first focus of the ellipsoid and a second focus situated on the straight line joining the second focus of the ellipsoid to the junction point of the corresponding elliptical arc with the elliptical arc constituting the section of the said dome-shaped segment through the plane containing the major axis of the ellipsoid, wherein a deformation has been imparted to the dome-shaped segments such that it has the form of an oval the major axis of which is horizontal, this major axis being greater than the initial diameter of the circumference by about 0,05 times the initial radius of said circumference, and that said device has the form of a screen-cup situated under the light source, said reflector being such that the rear and forward parts form two distinct elements and that the first focus of said ellipsoid is situated inside the dome-shaped segment, said second focus of this ellipsoid being situated outside the reflector, the second focus of said elliptical arc being situated inside the straight line segment connecting the second focus of the ellipsoid to the junction point, this second focus of the elliptical arc being distinct from the second focus of the ellipsoid and being situated outside the reflector, said headlight including a mask disposed forwardly of the said reflector so that the mask, at least partially masks for the driver of an on-coming vehicle the upper part of the reflector.

2. A dipped-beam headlight as claimed in claim 1, in which the reflector is such that the forward circumference of the dome-shaped segment is situated in a plane perpendicular to the major axis of the ellipsoid and in which the second foci of the elliptical arcs of the ellipsoidal surfaces are symmetrical with respect to the said major axis.

3. A dipped-beam headlight as claimed in claim 1, in which the light source is disposed a small distance substantially vertically above the focus of the said reflector.

4. A dipped-beam headlight as claimed in claim 1 including a plate made of transparent material disposed forwardly of the reflector and forwardly of the second focus of the ellipsoid of said reflector, and including near its edges rigs of prismatic section on one of its surfaces, said plate being so disposed as to be substantially perpendicular to the reflector axis and said ribs being situated on the reflector side.

5. A dipped-beam headlight as claimed in claim 4, in which the transparent plate comprises an annulus which surrounds an opening whose dimensions correspond to those of the central beam.

6. A dipped-beam headlight as claimed in claim 4, in which said mask is situated substantially in the same vertical plane as the plate made of transparent material.

7. A dipped-beam headlight as claimed in claim 1, including means for imparting said deformation.

8. A dipped-beam headlight as claimed in claim 7, wherein said deformation imparting means comprise a frame surrounding said segment.

* * * * *